(12) United States Patent
Toi et al.

(10) Patent No.: US 6,702,911 B2
(45) Date of Patent: Mar. 9, 2004

(54) COMPOSITE MATERIAL-STIFFENED PANEL AND MANUFACTURING METHOD THEREOF

(75) Inventors: Yasuhiro Toi, Tokyo-To (JP); Masahiro Noda, Tokyo-To (JP); Atsushi Harada, Tokyo-To (JP); Shigeki Tanaka, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/023,725

(22) Filed: Dec. 21, 2001

(65) Prior Publication Data

US 2002/0081415 A1 Jun. 27, 2002

(30) Foreign Application Priority Data

Dec. 22, 2000 (JP) .......................... 2000-390312

(51) Int. Cl.[7] .............................. B32B 31/14
(52) U.S. Cl. ................. 156/93; 156/285; 428/102; 244/131; 264/101; 264/258
(58) Field of Search ................ 156/93, 285; 428/102; 244/131, 133; 264/101, 258

(56) References Cited

U.S. PATENT DOCUMENTS

| | | |
|---|---|---|
| 4,331,723 A | 5/1982 | Hamm |
| 5,242,523 A | 9/1993 | Wilden et al. |
| 5,304,339 A | 4/1994 | Le Comte |
| 6,099,906 A * | 8/2000 | Palmer et al. ............. 427/296 |
| 6,159,414 A | 12/2000 | Tunis, III et al. |
| 6,187,411 B1 * | 2/2001 | Palmer ....................... 428/102 |

FOREIGN PATENT DOCUMENTS

EP    0 650 825    5/1995

* cited by examiner

Primary Examiner—Alexander S. Thomas
(74) Attorney, Agent, or Firm—Smith, Gambrell & Russell LLP

(57) ABSTRACT

A composite material-stiffened panel has a skin obtained by molding a fiber-reinforced resin composite material into a flat skin, stiffeners arranged in rows on one surface of the skin, and a fiber-reinforced resin-composite material stitched on the skin covering the stiffeners. The composite material-stiffened panel can be manufactured as follows: A first fabric material is placed on a tool having a panel-shaped surface. Stiffeners are placed on the first fabric materials. A second fabric material is placed on the stiffeners to cover at least some of the stiffeners. The second fabric materials are reformed to match the shape of the stiffeners. The reformed second fabric material is stitched on the first fabric material along edges of the stiffeners. All the materials are covered with a bagging film for vacuum. Resin is infiltrated into the fabric materials by a RTM or a RFI method. The infiltrated resin is heated to be hardened.

16 Claims, 5 Drawing Sheets

COMPOSITE MATERIAL-STIFFENED PANEL AND MANUFACTURING METHOD THEREOF

BACKGROUND OF THE INVENTION

1. Field of the Invention

The present invention relates to a composite material-stiffened panel to be applied to a wing and a tail assembly of an aircraft and a manufacturing method thereof.

2. Description of the Related Art

As a conventional stiffened panel, stiffened panels shown in FIGS. 1 through 4 are known.

A stiffened panel 10 shown in FIG. 1 is formed in such a manner that a skin 11 and a stiffener 12 are manufactured according to respective shapes, and they are bound to each other by a fastener 13 (rivet or the like).

A stiffened panel 10a shown in FIG. 2 is formed in such a manner that a skin 11a and a stiffener 12a are manufactured according to respective shapes, and they are bonded by an adhesive 14.

A stiffened panel 10b shown in FIG. 3 is formed in such a manner that a metal thick plate 15 shown by a dotted line is machined to be a stiffened panel (solid line).

A stiffened panel 10c shown in FIG. 4 is formed in such a manner that a composite material is formed into a stiffened plate by molding a skin 17 and a stiffener 18 integrally by means of a molding tool 16.

The method of manufacturing a stiffened panel by binding a skin and a stiffener by means of a fastener requires molding of the skin and the stiffener and provision of a positioning tool, thus resulting in high cost. Other problems are strict fastener design requirements (hole-edge distance and skin thickness for no sharp edges to a countersink) and reducing of fatigue strength due to a fastener-hole stress concentration.

The method of manufacturing a stiffened panel by bonding a skin and a stiffener by means of an adhesive requires molding of the skin and the stiffener, a pre-bonding process for the skin and the stiffener, positioning the skin and the stiffener, and provision of a pressurized holding tool for bonding, thus the cost becomes high.

The method of manufacturing a stiffened panel by machining a thick metal plate by machine working has a problem that since much of the material is cut and discarded, resources are wasted, and a problem that as weight efficiency is heightened, the cost of machine working becomes higher.

The method of manufacturing a stiffened panel by means of integral molding of a composite material has a problem of high cost factors such as provision of a complex tool for an accurately and integrally molded shape and of pressurizing the entire surface and an increase in scrap risk.

SUMMARY OF THE INVENTION

In view of the problems discussed above, an object of the present invention is to provide a composite material-stiffened panel for enhanced bonding of a fiber-reinforced resin-composite skin and a stiffener and a manufacturing method thereof.

The present invention provides a composite material-stiffened panel including: a skin obtained by molding a fiber-reinforced resin-composite material into a flat skin; stiffeners arranged in rows on one surface of the skin; and a fiber-reinforced resin-composite material stitched on the skin and covering the stiffeners.

Moreover, the present invention provides a method of manufacturing a composite material-stiffened panel including the steps of: placing a first fabric material on a tool having a panel-shaped surface; placing stiffeners on the first fabric material; placing a second fabric material on the stiffeners so as to cover at least some of the stiffeners; reforming the second fabric material so as to match the shape of the stiffeners; stitching the reformed second fabric material on the first fabric material along edges of the stiffeners; covering all the materials with a bagging film for vacuum; infiltrating resin into the fabric materials by a RTM or a RFI method; and heating the infiltrated resin to be hardened.

Moreover, the present invention provides a method of manufacturing a composite material-stiffened panel including the steps of: placing a first fabric material on a tool having panel-shaped surface; placing a second fabric material on the first fabric material so as to be loosened in some places for stiffeners to be put through; putting the stiffeners through between the loosened second fabric material and the first fabric material; reforming the second fabric material so as to match the shape of the stiffeners; stitching the reformed second fabric material on the first fabric material along edges of the stiffeners; covering all the materials with a bagging film for vacuum; infiltrating resin into the first and second fabric materials by a RTM or a RFI method; and heating the infiltrated resin, to be hardened.

DETAILED DESCRIPTION OF PREFERRED EMBODIMENTS

Preferred embodiments according to the present invention will be disclosed with reference to the attached drawings.

Figure 5:
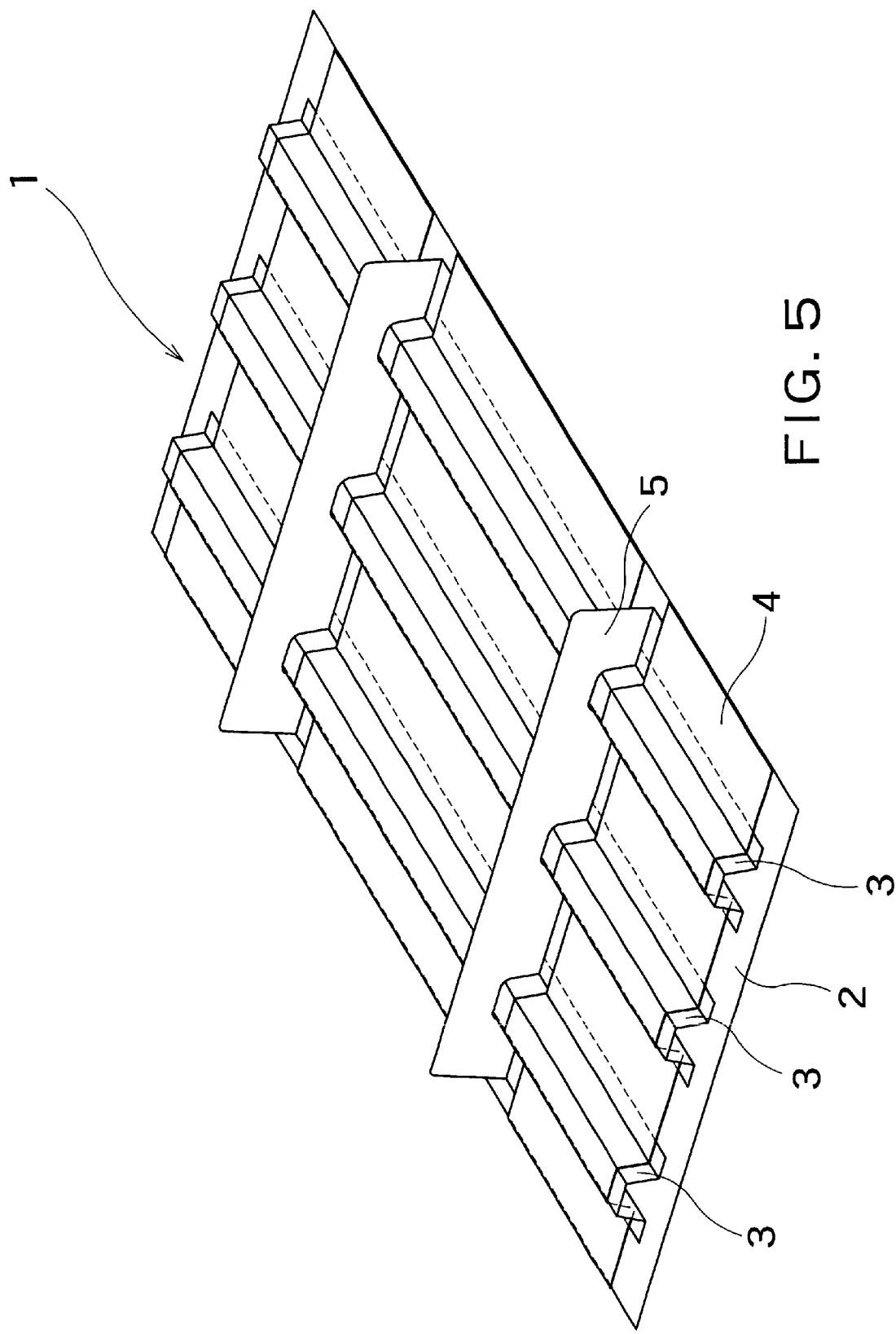
FIG. 5 is a perspective view showing an embodiment of a composite material-stiffened panel according to the present invention.

In FIG. 5, a composite material-stiffened panel 1 is applied to an aircraft wing and tail-assembly to be a fuel tank.

The composite material-stiffened panel 1 has a skin 2, several stiffeners 3, a fiber-reinforced resin-composite material 4 and ribs 5. The skin 2 is obtained by molding a fiber-reinforced resin-composite material into a flat skin. The stiffeners 3 are arranged in rows on one surface of the skin 2 with a gap in one direction. The fiber-reinforced resin-composite material 4 is provided on and stitched on the skin 2 so as to partially cover the stiffeners 3. The ribs 5 connect the stiffeners 3 each arranged in rows.

It is preferable that the fiber of the fiber-reinforced resin-composite material 2 is composed of a composite-material dry preform of three-dimensional fabric where warp, weft and vertical yarn are combined three-dimensionally with warp-enhanced inter-layer strength in a thickness-wise direction. The fiber of the fiber-reinforced resin-composite material 2 may, however, be obtained by laminating and stitching integrally normal fabrics.

Each stiffener 3 is made of a composite material having an approximately U-shaped section with a flange portion extended outward. The composite material is hardened or semi-hardened for molding. As for the shape, even if the stiffener 3 is not formed in accordance with a molded contact individually, they preferably have shape characteristic that their open cross section has twist and bending flexibility and only axial rigidity is sufficient. It is also preferable that the stiffener 3 has a shape such that it is rigid in an axial direction and it is twisted and bent sufficiently, for example, has an open cross section of like a thin channel material.

In the present embodiment, each stiffener 3 is a fiber-reinforced resin-composite material, but it may be a metal member. For example, when the composite material is a carbon fiber-reinforced resin-composite material, a surface-treated titanic alloy can be used as the stiffener 3.

It is preferable that the fiber of the fiber-reinforced resin-composite material 4 is a three-dimensional fabric where warp, weft and vertical yarn in three direction are combined three-dimensionally. The fiber of the fiber-reinforced resin-composite material 4 may, however, be obtained by laminating and stitching integrally several normal fabrics.

Figure 1:
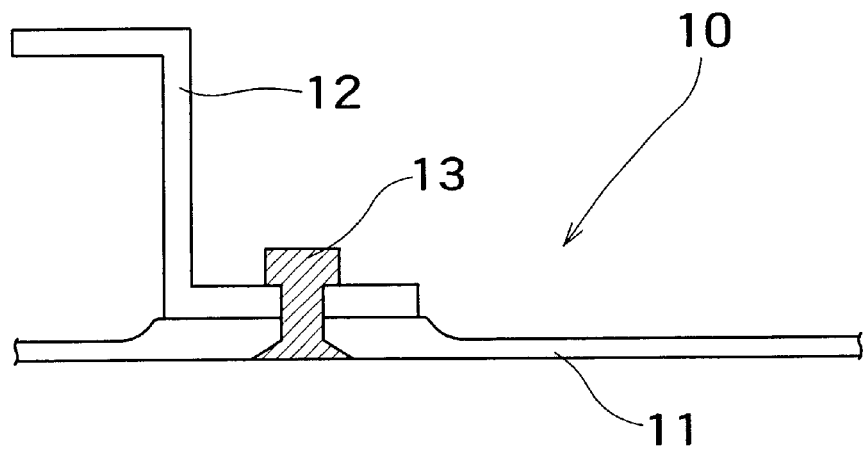
FIG. 1 is an illustration showing a conventional in stiffened panel.
Figure 2:
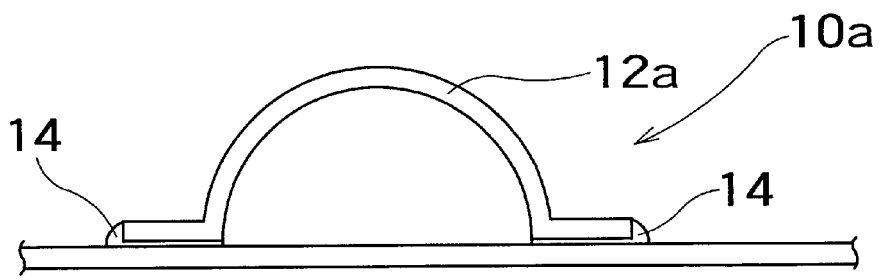
FIG. 2 is an illustration showing another conventional stiffened panel.
Figure 3:
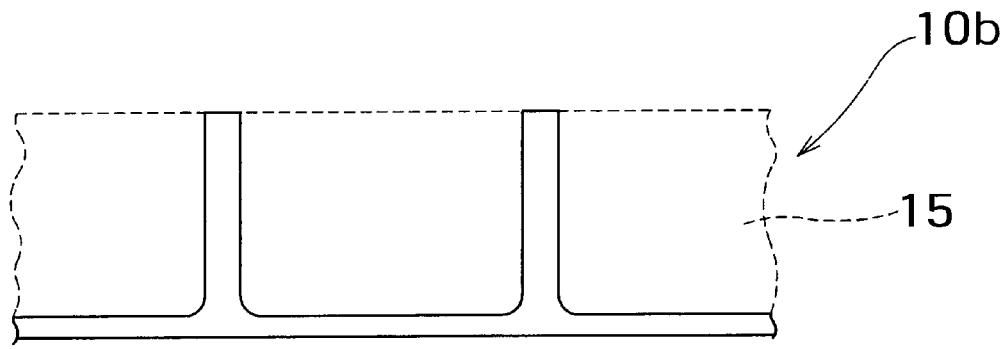
FIG. 3 is an illustration showing still another conventional stiffened panel.
Figure 4:
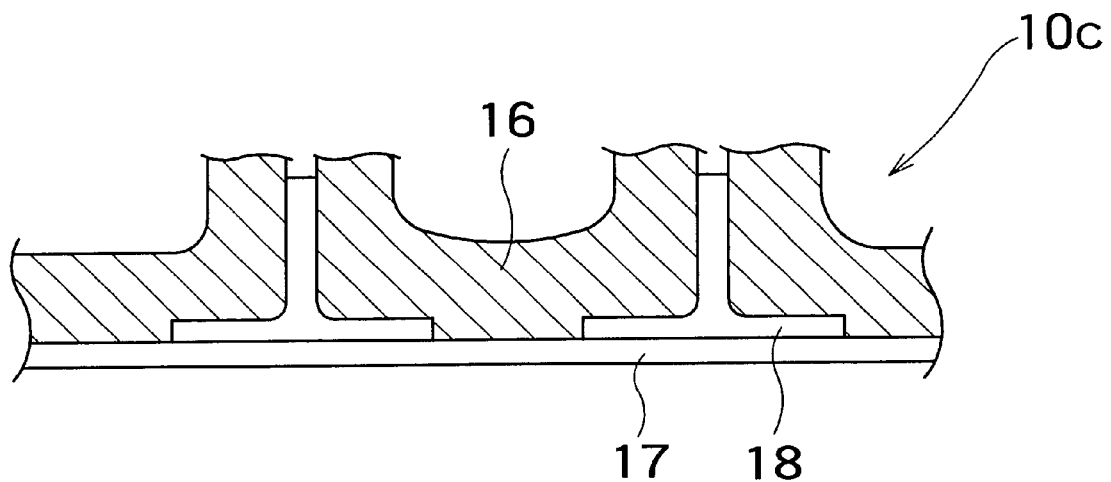
FIG. 4 is an illustration showing a further conventional stiffened panel.
Figure 6:
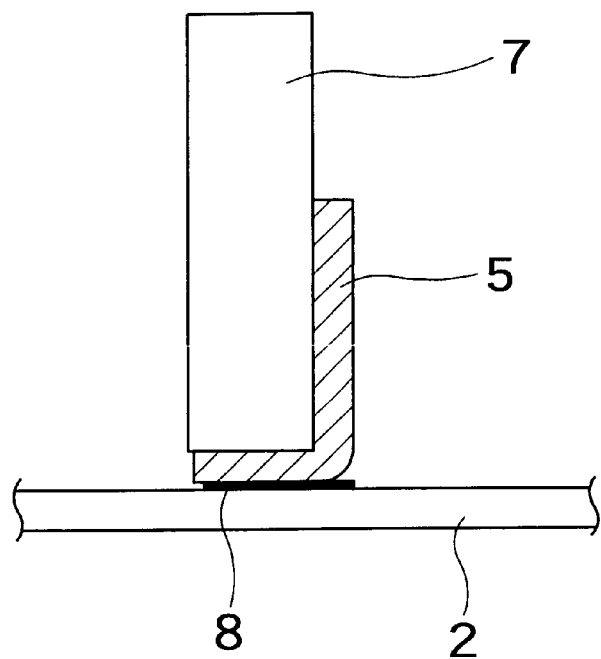
FIG. 6 is an illustration showing one example of a method of attaching a molded rib to a skin.
Figure 7:
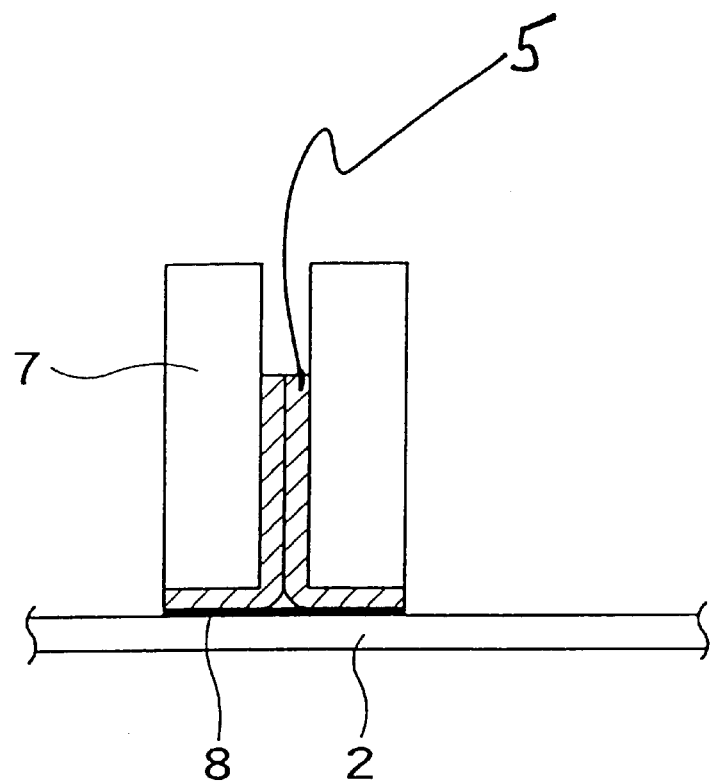
FIG. 7 is an illustration showing another example of a method of attaching a molded rib to a skin.

As shown in FIG. 6, the rib 5 is formed in such a manner that a portion of one end of a prepreg-band material through which the stiffener 3 is to be put is cut out and is bent by a molding tool 7 so as to have an L-shaped section. Moreover, as shown in FIG. 7, the rib 5 may be formed in such a manner that two prepregs are molded by the molding tool 7 so as to have a L-shaped section for lamination. The rib 5 is placed on the skin 2 via an adhesive 8 and is heated to be hardened together with the skin 2, the stiffener 3 and the fiber-reinforced resin-composite material 4 for bonding.

Figure 8:
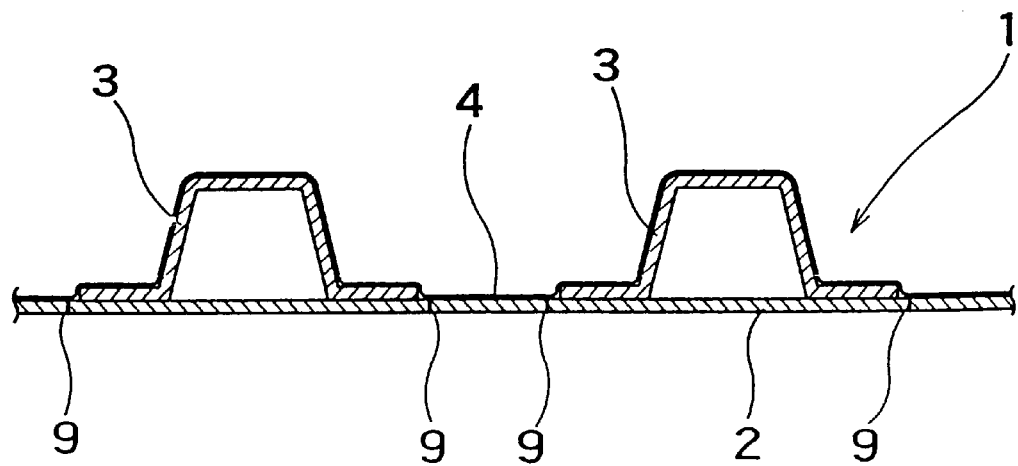
FIG. 8 is an enlarged section showing the composite material-stiffened panel of the present invention.

In FIG. 8, a stitch yarn 9 is used for binding the skin 2 and the fiber-reinforced resin-composite material 4.

A method of manufacturing a composite material stiffened panel will be explained below.

In this explanation, the same reference numerals are given to the fiber-reinforced resin-composite material and fiber composing it in the common portions.

Prepared first are a three-dimensional fabric material 2 which reinforces the skin 2, the stiffener 3 made of a hardened or semi-hardened fiber-reinforced resin-composite material, another three-dimensional fabric materials 3 which reinforce the fiber-reinforced resin-composite material 4, and a prepreg rib 5 molded to have a L-shaped section.

The three-dimensional fabric material 2 is placed on a molding surface of a tool (not shown) having a panel-shaped surface. The stiffeners 3 are arranged in rows on the three-dimensional fabric material 2 with an interval in one direction.

The other three-dimensional fabric material 4 is placed on the three-dimensional fabric material 2 so as to cover the stiffeners 3 so that it crosses over from one side to the other side. The other three-dimensional fabric material 4 may, however, cover some stiffeners 3.

The other three-dimensional fabric material 4 placed to cover the stiffeners 3 is reformed to match the shape of the outer surface of each stiffener 3.

The reformed other three-dimensional fabric material 4 is subject to a stitching process along edge portions of the stiffeners 3 in a longitudinal direction of the stiffeners 3. The other three-dimensional fabric material 4 is bound to the three-dimensional fabric material 2 by a stitch yarn 9. As a result, the stiffeners 3 can be positioned on predetermined positions without a positioning tool.

The ribs 5 of band-shaped prepreg with a molding tool 7 abutting on portions from which the arranged stiffeners 3 have been removed are placed on the three-dimensional fabric material 2 or 4 via the adhesive 8 (in FIG. 5, the molding tool is omitted).

All of the materials are covered with a bagging film for vacuum (not shown). Resin is introduced into the fabric materials by a RTM (resin transfer molding) method or a RFI (resin film infusion) method. The infiltrated resin is then heated to be hardened to mold the composite material-stiffened panel 1.

Figure 9:
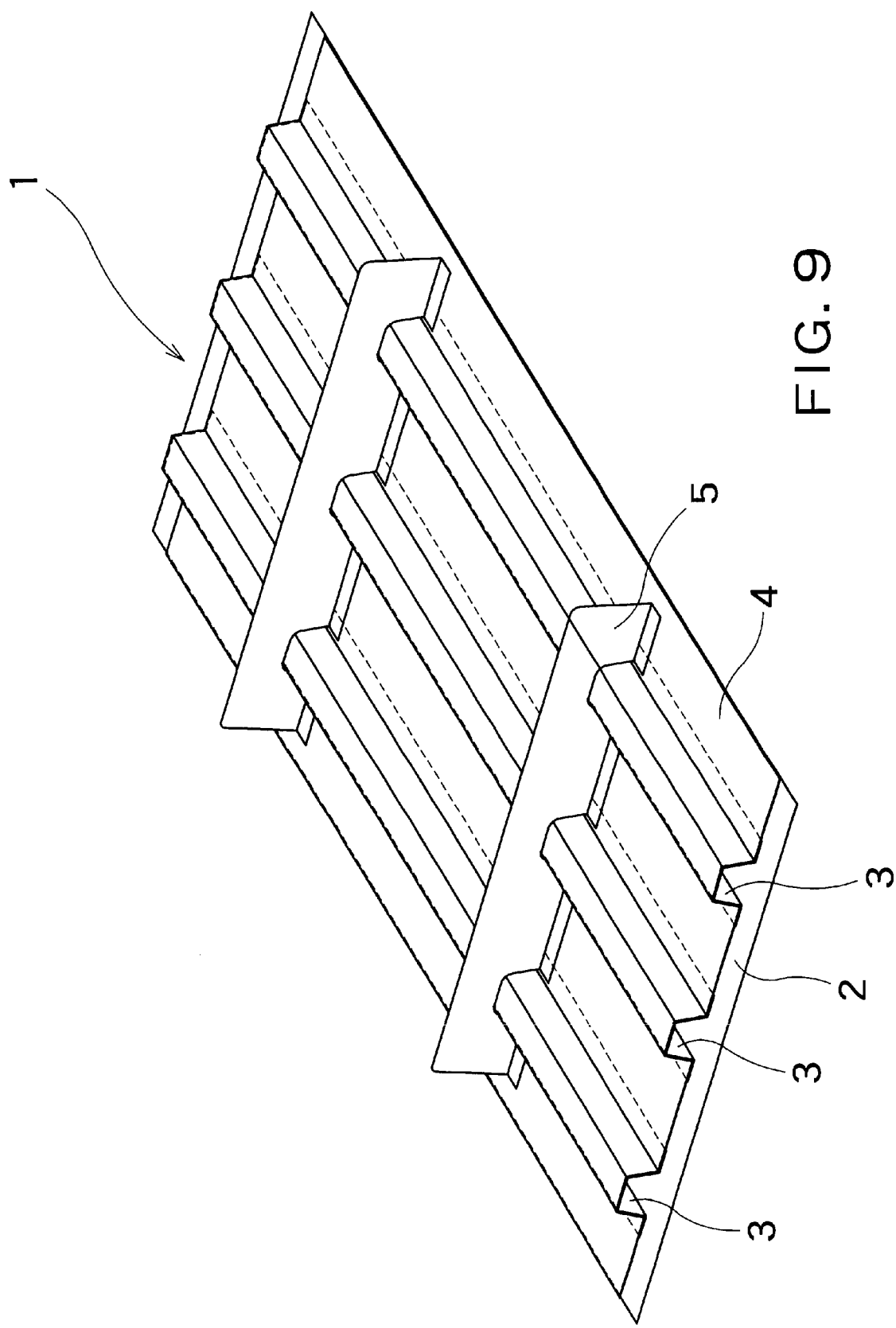
FIG. 9 is a perspective view showing another embodiment of a composite material-stiffened panel according to the present invention.

FIG. 9 shows another embodiment of a method of manufacturing the composite material-stiffened panel 1 according to the present invention.

In FIG. 9, elements in this embodiment that are identical or analogous to the elements in the former embodiments are referenced by the same numerals.

Prepared first are the three-dimensional fabric material 2, the stiffeners 3 made of hardened or semi-hardened fiber-reinforced resin-composite material, the other three-dimensional fabric material 4, the ribs 5 where one end of a band-shaped prepreg has been partially notched and bent to provide a bent L-shaped section, and the molding tool 7.

The three-dimensional fabric material 2 is placed on a molding surface of a tool (not shown) having a panel-shaped surface. The band-shaped fabric material 4 is placed on the three-dimensional fabric material 2 so as to be loosened in some places so that the stiffeners 3 can be put through. A width of the other fabric material 4 may be such that it covers all of the stiffeners 3 or covers some of them.

The stiffeners 3 are put between the loosened fabric material 4 and the fabric material 2. Portions of the loosened fabric material 4 corresponding to edges of the stiffeners 3 are stitched so that the other three-dimensional fabric material 4 is bound to the three-dimensional fabric material 2 by the stitch yarn 9. As a result, a positioning tool for the stiffeners for hardening is not necessary.

The ribs 5 are placed on the other fabric material 4 via the adhesive 8 with the molding tool 7 on which the ribs 5 are abutting while avoiding the notches of the stiffeners 3 arranged in rows (in FIG. 5, the molding tool 7 is omitted).

All of the materials are covered with a bagging film for vacuum, and resin is infiltrated into the fabric materials by the RTM or the RFI method, and the infiltrated resin is heated to be hardened to form the composite material-stiffened panel 1.

According to the composite material-stiffened panel of the present invention, the stiffeners arranged on the skin made of the fabric-reinforced resin-composite material is covered with another fabric-reinforced resin-composite material stitched on the skin along the edges of the stiffeners, so that the joint strength of the stiffeners and the skin is improved.

In the composite material stiffened panel manufacturing method of the present invention, the fabric material is placed on a tool having a panel-shaped surface and the stiffeners are placed thereon. Another fabric material is placed on the stiffeners so as to cover at least some of the stiffeners, the fabric material being reformed to match the shape of the stiffeners. The reformed fabric material is stitched on the fabric material along the edges of the stiffeners. All of the materials are covered with the bagging film for vacuum. Resin is infiltrated into the fabric materials by the RTM or the RFI method, and the infiltrated resin is heated to be hardened. As a result, it is not necessary to previously mold stiffeners one by one. The stiffeners can be positioned easily by stitching. Moreover, manufacturing of several molding tools and their complicated attachment and removal works can be omitted.

Furthermore in the composite material-stiffened panel manufacturing method of the present invention, the fabric material is placed on the tool having a panel-shaped surface. Another fabric material is placed on the aforementioned fabric material so that it is loosened in some places for the stiffeners to be put through. The stiffeners are put through between the loosened fabric material and the fabric material. Portions of the loosened fabric material corresponding to the edges of the stiffeners are stitched. All of the materials are covered with the bagging film for vacuum. Resin is infiltrated into the fabric materials by the RTM or the RFI method, and the infiltrated resin is heated to be hardened. As a result, it is not necessary to previously mold stiffeners one by one. The stiffeners can be positioned easily by stitching. Moreover, manufacturing of several molding tool and their complicated attachment and removal works can be omitted.

What is claimed is:

1. A composite material-stiffened panel manufacturing method comprising the steps of:
    placing a first fabric material on a tool having a panel-shaped surface;
    placing stiffeners on said first fabric material;
    placing a second fabric material on the stiffeners so as to cover at least some of said stiffeners;
    reforming said second fabric material so as to match the shape of said stiffeners;
    stitching said reformed second fabric material on said first fabric material along edges of said stiffeners;
    covering all the materials with a bagging film for vacuum;
    infiltrating resin into said fabric materials by a RTM or a RFI method; and
    heating the infiltrated resin to be hardened.

2. The composite material-stiffened panel manufacturing method according to claim 1, wherein said first and second fabric materials are stitched after three-dimensional fabrics or fabrics are laminated.

3. The composite material-stiffened panel manufacturing method according to claim 1, wherein after said reformed second fabric material has been stitched on said first fabric material along the edges of said stiffeners, prepreg ribs are arranged on said first fabric material and said stiffeners or said second fabric material so as to cross said stiffeners and to abut on a molding tool, all the materials including the molding tool are covered with the bagging film for vacuum, the resin is infiltrated into said first and second fabric materials by the RTM or the RFI method, and the infiltrated resin is heated to be hardened.

4. The composite material-stiffened panel manufacturing method according to claim 1, wherein said reformed second fabric material is subject to a stitching process along edge portions of said stiffeners in a longitudinal direction of said stiffeners.

5. The composite material-stiffened panel manufacturing method of claim 1, wherein the stiffeners placed on said first fabric material are made of a fiber-reinforced resin-composite material.

6. The composite material-stiffened panel manufacturing method of claim 1, wherein the stiffeners placed on said first fabric material have open cross-sections defining longitudinally extending hollow channels.

7. The composite material-stiffened panel manufacturing method of claim 1, wherein said stiffeners have a U-shaped cross-section with a central raised portion and flange portions extending outwardly to opposite sides of said central raised portion.

8. The composite material-stiffened panel manufacturing method of claim 1, wherein said stiffeners placed on said first fabric material are of metal.

9. The composite material-stiffened panel manufacturing method of claim 1, further comprising adhering ribs with an L-shaped cross-section to said first fabric material.

10. The composite material-stiffened panel manufacturing method of claim 1, wherein pairs of L-shaped ribs are arranged back-to-back along said first fabric material.

11. The composite material-stiffened panel manufacturing method of claim 1, further comprising positioning said stiffeners on said first fabric material by extending stitch lines in a direction of elongation of said stiffeners and to opposite side edges of each of said stiffeners to align said stiffeners without a need for a positioning tool.

12. A composite material-stiffened panel manufacturing method, comprising the steps of:
    placing a first fabric material on a tool having panel-shaped surface;
    placing a second fabric material on said first fabric material so as to be loosened in some places for stiffeners to be put through;
    putting the stiffeners through between said loosened second fabric material and said first fabric material;
    reforming said second fabric material so as to match the shape of said stiffeners;
    stitching said reformed second fabric material on said first fabric material along edges of said stiffeners;
    covering all the materials with a bagging film for vacuum;
    infiltrating resin into said first and second fabric materials by a RTM or a RFI method; and
    heating the infiltrated resin to be hardened.

13. The composite material-stiffened panel manufacturing method according to claim 12, wherein said first and second fabric materials are stitched after three-dimensional fabrics or fabrics are laminated.

14. The composite material-stiffened panel manufacturing method according to claim 12, wherein after said reformed second fabric material has been stitched on said first fabric material along the edges of said stiffeners, prepreg ribs are arranged on said first fabric material and said stiffeners or said second fabric material so as to cross said stiffeners and to abut on a molding tool, all the materials including the molding tool are covered with the bagging film for vacuum, the resin is infiltrated into said first and second fabric materials by the RTM or the RFI method, and the infiltrated resin is heated to be hardened.

15. The composite material-stiffened panel manufacturing method according to claim 12, wherein said reformed second fabric material is subject to a stitching process along edge portions of said stiffeners in a longitudinal direction of said stiffeners.

16. A composite material-stiffened panel manufacturing method comprising the steps of:

placing a first fabric material on a tool;

placing stiffeners on said first fabric material;

placing a second fabric material on the stiffeners so as to cover at least some of said stiffeners;

positioning said stiffeners on said first fabric material by extending stitch lines in a stitching direction that corresponds with a direction of elongation of said stiffeners and to opposite side edge of said stiffeners, and said extending of stitch lines involves stitching said reformed second fabric material to said first fabric material;

subjecting the first and second fabric materials and stiffeners to a vacuum process;

infiltrating resin into said fabric materials by a RTM or a RFI method; and heating the infiltrated resin to be hardened.

* * * * *